(12) United States Patent
Onodera et al.

(10) Patent No.: US 9,328,643 B2
(45) Date of Patent: May 3, 2016

(54) SELECTIVE CATALYTIC REDUCTION SYSTEM

(75) Inventors: Takao Onodera, Fujisawa (JP);
Hiroyuki Oohira, Fujisawa (JP);
Masanobu Minezawa, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 566 days.

(21) Appl. No.: 13/699,541

(22) PCT Filed: May 16, 2011

(86) PCT No.: PCT/JP2011/061212
§ 371 (c)(1),
(2), (4) Date: Nov. 21, 2012

(87) PCT Pub. No.: WO2011/148809
PCT Pub. Date: Dec. 1, 2011

(65) Prior Publication Data
US 2013/0071291 A1 Mar. 21, 2013

(30) Foreign Application Priority Data
May 25, 2010 (JP) ................................. 2010-119713

(51) Int. Cl.
*F01N 3/20* (2006.01)
*B01D 53/94* (2006.01)

(52) U.S. Cl.
CPC .............. *F01N 3/208* (2013.01); *F01N 2610/02* (2013.01); *F01N 2610/1493* (2013.01); *F01N 2900/1404* (2013.01); *F01N 2900/1626* (2013.01); *Y02T 10/24* (2013.01)

(58) Field of Classification Search
None
See application file for complete search history.

(56) References Cited

U.S. PATENT DOCUMENTS

| | | | |
|---|---|---|---|
| 2007/0283685 A1* | 12/2007 | Ripper | B01D 53/90 60/288 |
| 2009/0101656 A1* | 4/2009 | Leonard | 220/562 |
| 2010/0071349 A1* | 3/2010 | Kitazawa | 60/277 |
| 2010/0122521 A1* | 5/2010 | Sun | F01N 3/208 60/284 |

FOREIGN PATENT DOCUMENTS

| | | |
|---|---|---|
| JP | 2000-303826 | 10/2000 |
| JP | 2003-222019 | 8/2003 |

(Continued)

OTHER PUBLICATIONS

Naohisa et.al. JP2005273503—machine translation.*

(Continued)

*Primary Examiner* — Walter D Griffin
*Assistant Examiner* — Jelitza Perez
(74) *Attorney, Agent, or Firm* — Staas & Halsey LLP (57) ABSTRACT

A selective catalytic reduction (SCR) system that can prevent fixation of urea solution to an interior of a dosing valve when the urea solution is not injected through the dosing valve. An SCR system closes a dosing valve when the exhaust gas temperature is lower than a temperature at which an SCR catalyst becomes active and is provided with a fixation prevention system that opens the dosing valve and controls a supply module to feed the urea solution in the dosing valve back to a urea tank to prevent fixation of the urea solution to the interior of the dosing valve, when the exhaust gas temperature is equal to or higher than a temperature at which the urea solution crystallizes and lower than the temperature at which the SCR catalyst becomes active.

2 Claims, 5 Drawing Sheets
(1 of 5 Drawing Sheet(s) Filed in Color)

(56) References Cited

FOREIGN PATENT DOCUMENTS

| JP | 2005-113688 | 4/2005 |
|---|---|---|
| JP | 2005-273503 | 10/2005 |
| JP | 2006-342735 | 12/2006 |
| JP | 2008-101564 | 5/2008 |
| JP | 2009-97479 | 5/2009 |

OTHER PUBLICATIONS

International Search Report of Corresponding PCT Application PCT/JP2011/061212 mailed Jul. 26, 2011.
Patent Abstracts of Japan, Publication No. 2009-097479, Published May 7, 2009.
Patent Abstracts of Japan, Publication No. 2000-303826, Published Oct. 31, 2000.
Patent Abstracts of Japan, Publication No. 2008-101564, Published May 1, 2008.
Patent Abstracts of Japan, Publication No. 2006-342735, Published Dec. 21, 2006.
Patent Abstracts of Japan, Publication No. 2005-273503, Published Oct. 6, 2005.
Patent Abstracts of Japan, Publication No. 2005-113688, Published Apr. 28, 2005.
Patent Abstracts of Japan, Publication No. 2003-222019, Published Aug. 8, 2003.
Written Opinion of the International Searching Authority mailed Jul. 26, 2011 in corresponding International Application No. PCT/JP2011/061212.

* cited by examiner

SELECTIVE CATALYTIC REDUCTION SYSTEM

CROSS-REFERENCE TO RELATED APPLICATIONS

This application claims the benefit of Japanese Patent Application No. 2010-119713, filed on May 25, 2010, the contents of which is incorporated herein by reference, which serves as priority for PCT Application No. PCT/JP2011/061212, filed May 16, 2011.

TECHNICAL FIELD

The present invention relates to a selective catalytic reduction ("SCR") system provided with an fixation prevention system that prevents malfunction of a dosing valve by preventing crystallization of urea solution in the dosing valve and fixation of the crystal to a cylinder or valving element of the dosing valve.

BACKGROUND ART

An SCR system incorporating an SCR device that has been developed is an exhaust gas purification system that purifies exhaust gas of a diesel engine of $NO_X$.

The SCR system is to purify exhaust gas of $NO_X$ by supplying urea solution stored in a urea tank to an upstream part of the exhaust gas and reducing the $NO_X$ on an SCR catalyst with ammonia derived from the urea solution by the heat of the exhaust gas (see Patent Literature 1, for example).

A process of deriving ammonia from urea solution will be described below with reference to FIG. 4.

Figure 4:
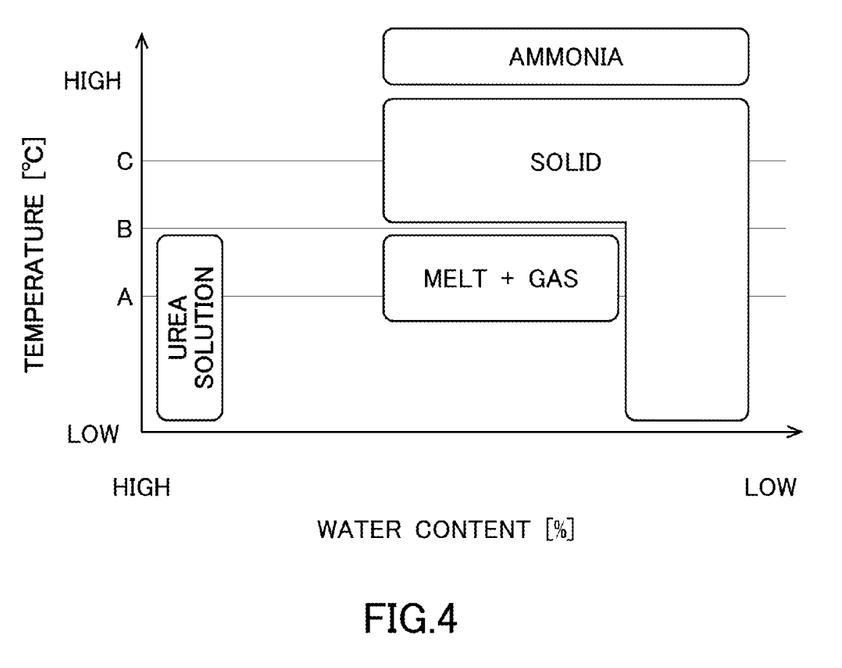
FIG. 4 is a diagram showing a change of state of urea solution with temperature.

As shown in FIG. 4, as the temperature of the urea solution rises beyond the boiling point, water starts evaporating, and the urea solution transforms into melt and then to gas. The resulting gas crystallizes into solid as the temperature further rises. The resulting solid then sublimates into ammonia. Part of the melt and gas are hydrolyzed with stream to form ammonia and carbonic acid gas.

The urea solution is injected through a dosing valve (a urea injection device or a dosing module) provided to be exposed in the exhaust pipe at the upstream side of the SCR device.

Figure 5:
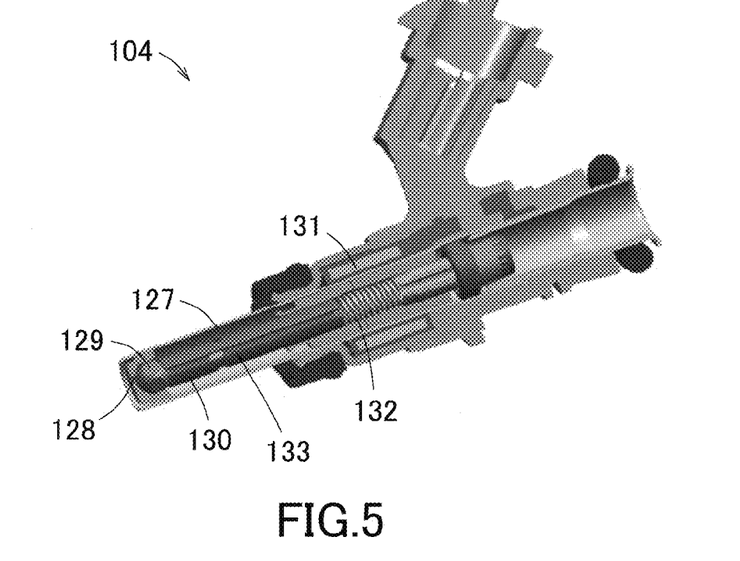
FIG. 5 is a cross-sectional perspective view of a dosing valve.

As shown in FIG. 5, a dosing valve 104 includes a cylinder 127 having an injection orifice 128 and filled with urea solution at high pressure, a tubular plunger 130 having a slit 133, and a valving element 129 to close the injection orifice 128 that is attached to the plunger 130. A coil 131 is energized to pull up the plunger 130 to separate the valving element 129 from the injection orifice 128, thereby injecting the urea solution. Furthermore, a spring 132 is provided in the dosing valve 104 to bias the valving element 129 to be normally closed via the plunger 130. Therefore, when energization of the coil 131 is stopped, the plunger 130 is pushed down by the spring to make the valving element 129 close the injection orifice 128, thereby stopping injection of the urea solution.

Figure 6:
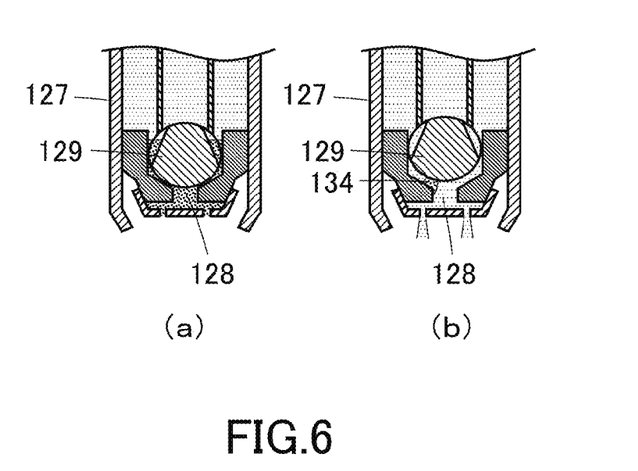
FIGS. 6(a) and 6(b) are cross-sectional views for illustrating failures of the dosing valve.

The dosing valve 104 is provided in the exhaust pipe, through which exhaust gas at high temperature flows. Therefore, as the temperature of the dosing valve 104 rises, the temperature of the urea solution in the dosing valve 104 also rises. As a result, the urea solution in the dosing valve 104 crystallizes and adheres to the valving element 129 as shown in FIG. 6(a), or the urea solution crystallizes into a solid 134, and the solid 134 gets caught between the valving element 129 and a valve seat on the cylinder 127 to make it impossible to stop injection of the urea solution as shown in FIG. 6(b), thereby leading to malfunction of the dosing valve 104 and failure of proper control of injection of the urea solution.

CITATION LIST

Patent Literature 1: Japanese Patent Laid-Open No. 2000-303826

When the urea solution is injected through the dosing valve 104, the failure described above does not occur because the urea solution in the urea tank that is not at high temperature is appropriately supplied to the dosing valve 104.

However, the injection of the urea solution through the dosing valve 104 occurs only at temperatures at which the SCR catalyst is active, that is, at temperatures at which the purification reaction with the SCR catalyst occurs. Since the temperatures at which the SCR catalyst is active are those equal to or higher than C ° C., there is a problem that the urea solution remains in the dosing valve 104 and crystallizes to cause malfunction of the dosing valve 104 at temperatures equal to or higher than A ° C. at which the urea solution starts crystallizing and lower than C ° C. at which the SCR catalyst becomes active.

SUMMARY OF THE INVENTION

Thus, an object of the present invention is to provide an SCR system that can prevent fixation of urea solution to the interior of a dosing valve when the urea solution is not injected through the dosing valve.

Solution to Problem

The present invention has been devised to attain the object described above. An SCR system is provided including a dosing valve that is provided to be exposed in an exhaust pipe to inject urea solution on an upstream side of an SCR device and a supply module that sucks up urea solution in a urea tank and supplies the urea solution to the dosing valve and feeds the urea solution in the dosing valve back to the urea tank, the dosing valve being closed when an exhaust gas temperature is lower than a temperature at which an SCR catalyst becomes active, wherein the SCR system further includes a fixation prevention system that opens the dosing valve and controls the supply module to feed the urea solution in the dosing valve back to the urea tank to prevent fixation of the urea solution to an interior of the dosing valve when the exhaust gas temperature is equal to or higher than a temperature at which the urea solution crystallizes and lower than the temperature at which the SCR catalyst becomes active.

An SCR system is provided including a dosing valve that is provided to be exposed in an exhaust pipe to inject urea solution on an upstream side of an SCR device and a supply module that sucks up urea solution in a urea tank and supplies the urea solution to the dosing valve and feeds the urea solution in the dosing valve back to the urea tank, the dosing valve being closed when an exhaust gas temperature is lower than a temperature at which an SCR catalyst becomes active, wherein the SCR system further includes an fixation prevention system that opens the dosing valve at predetermined time intervals to prevent fixation of the urea solution to an interior of the dosing valve when the exhaust gas temperature is equal to or higher than a temperature at which the urea solution crystallizes and lower than the temperature at which the SCR catalyst becomes active.

The supply module is provided between the urea tank and the dosing valve and includes a supply module ("SM") pump that pressure-feeds the urea solution and a reverting valve that switches between liquid feed channels through which the SM pump feeds the urea solution.

According to the present invention, urea solution can be prevented from adhering to the interior of a dosing valve when the urea solution is not injected through the dosing valve.

BRIEF DESCRIPTION OF DRAWINGS

The patent or application file contains at least one drawing executed in color. Copies of this patent or patent application publication with color drawing(s) will be provided by the Office upon request and payment of the necessary fee.

DESCRIPTION OF EMBODIMENTS

In the following, preferred embodiments of the present invention will be described with reference to the accompanying drawings.

First, an SCR system installed on a vehicle will be described.

Figure 1:
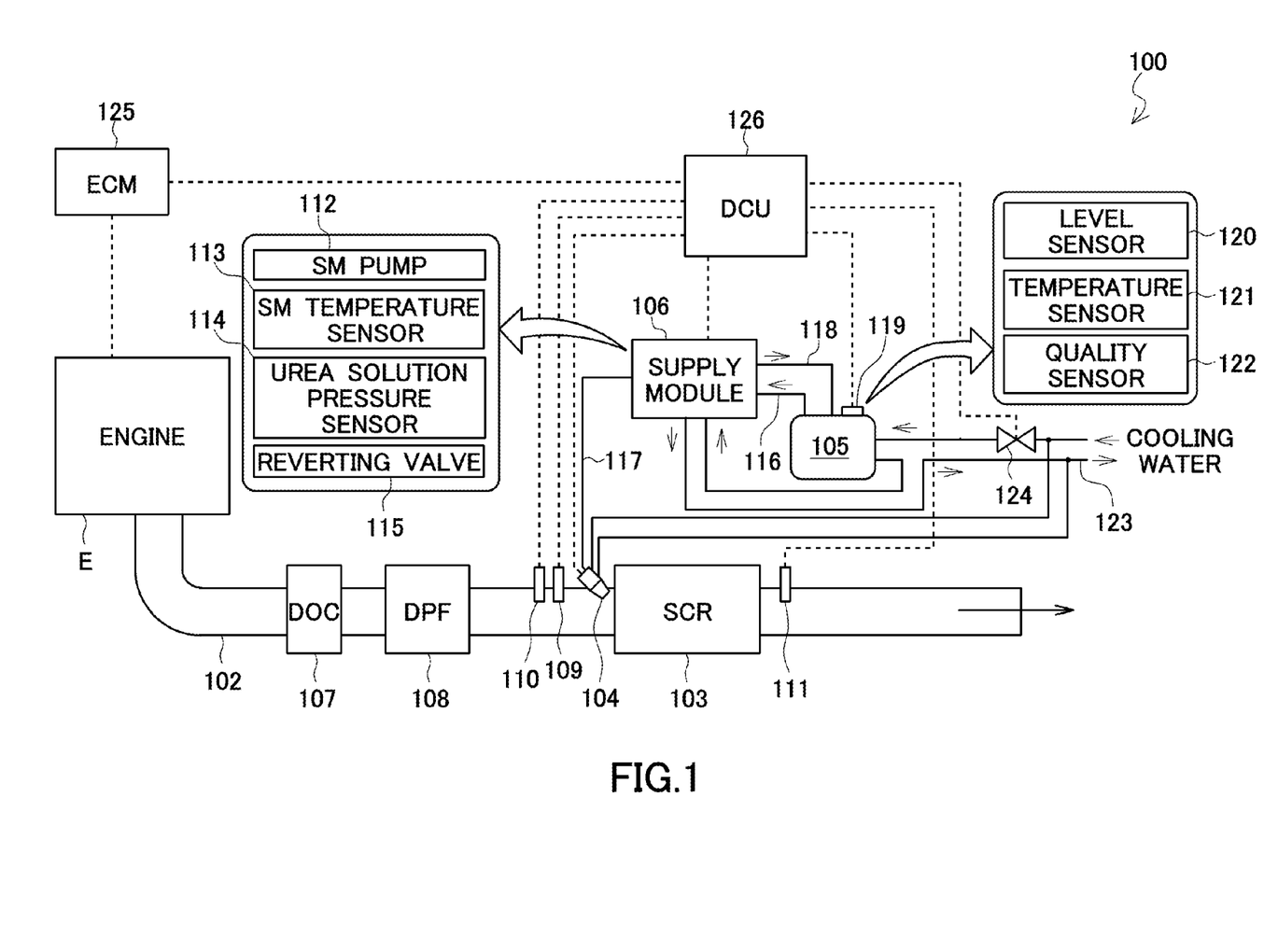
FIG. 1 is a schematic diagram showing an SCR system according to the present invention.

As shown in FIG. 1, an SCR system 100 primarily includes an SCR device 103 provided on an exhaust pipe 102 of an engine E, a dosing valve (a urea injection device or a dosing module) 104 that is provided to be exposed in the exhaust pipe to inject urea solution on the upstream side of the SCR device 103 (in an upstream part of exhaust gas), a urea tank 105 that stores the urea solution, a supply module 106 that supplies the urea solution stored in the urea tank 105 to the dosing valve 104, and a dosing control unit (DCU) 126 that controls the dosing valve 104, the supply module 106 and other components.

In order from upstream to downstream of the exhaust gas, the exhaust pipe 102 of the engine E is provided with a diesel oxidation catalyst (DOC) 107, a diesel particulate filter (DPF) 108 and the SCR device 103. The DOC 107 is intended to oxidize NO in the exhaust gas discharged from the engine E to produce NO2 to adjust the ratio between NO to NO2 in the exhaust gas in order to improve the denitration efficiency of the SCR device 103. The DPF 108 is intended to collect particular matter (PM) in the exhaust gas.

The exhaust pipe 102 is provided with the dosing valve 104 on the upstream side of the SCR device 103. As described above with reference to FIG. 5, the dosing valve 104 includes a cylinder 127 having an injection orifice 128 and filled with urea solution at high pressure, a tubular plunger 130 having a slit 133, and a valving element 129 to close the injection orifice 128 that is attached to the plunger 130, and a coil 131 is energized to pull up the plunger 130 to separate the valving element 129 from the injection orifice 128, thereby injecting the urea solution. Furthermore, a spring 132 is provided in the dosing valve 104 to bias the valving element 129 to be normally closed via the plunger 130. Therefore, when energization of the coil 131 is stopped, the plunger 130 is pushed down by the spring to make the valving element 129 close the injection orifice 128, thereby stopping injection of the urea solution.

On the upstream side of the dosing valve 104, the exhaust pipe 102 is provided with an exhaust gas temperature sensor 109 that measures the temperature (SCR inlet temperature) of the exhaust gas at an inlet of the SCR device 103. Furthermore, an upstream-side $NO_X$ sensor 110 that detects the $NO_X$ concentration on the upstream side of the SCR device 103 is provided on the upstream side of the SCR device 103 (on the upstream side of the exhaust gas temperature sensor 109 in this example), and a downstream-side $NO_X$ sensor 111 that detects the $NO_X$ concentration on the downstream side of the SCR device 103 is provided on the downstream side of the SCR device 103.

The supply module 106 includes an SM pump 112 that pressure-feeds the urea solution, an SM temperature sensor 113 that measures the temperature of the supply module 106 (the temperature of the urea solution flowing through the supply module 106), a urea solution pressure sensor 114 that measures the pressure of the urea solution in the supply module 106 (the pressure on the outlet side of the SM pump 112), and a reverting valve 115 that switches between urea solution flow channels to selectively supply the urea solution in the urea tank 105 to the dosing valve 104 or feed the urea solution in the dosing valve 104 back to the urea tank 105. In this example, the urea solution in the urea tank 105 is supplied to the dosing valve 104 when the reverting valve 115 is turned off, and the urea solution in the dosing valve 104 is fed back to the urea tank 105 when the reverting valve 115 is turned on.

When the reverting valve 115 is set to supply urea solution to the dosing valve 104, the SM pump 112 of the supply module 106 sucks up the urea solution in the urea tank 105 through a liquid feed line (suction line) 116, supplies the urea solution to the dosing valve 104 through a pressure-feed line (pressure line) 117, and feeds any excessive urea solution back to the urea tank 105 through a collection line (back line) 118.

In the key off state (ignition off state or vehicle stop state), the reverting valve 115 is switched to feed the urea solution in the dosing valve 104 back to the urea tank 105, thereby preventing crystallization of urea solution, which causes occurrence of malfunction of the dosing valve 104. The control to feed the urea solution in the dosing valve 104 back to the urea tank 105 is referred to as emptying in this specification.

In emptying, the dosing valve 104 is previously opened, and then the urea solution in the dosing valve 104 is fed back to the urea tank 105, so that the exhaust gas (air) in the exhaust pipe 102 is also sucked into the urea tank 105 via the dosing valve 104.

Next, an example of a configuration of lines in and around the supply module 106 will be described.

Figure 2:
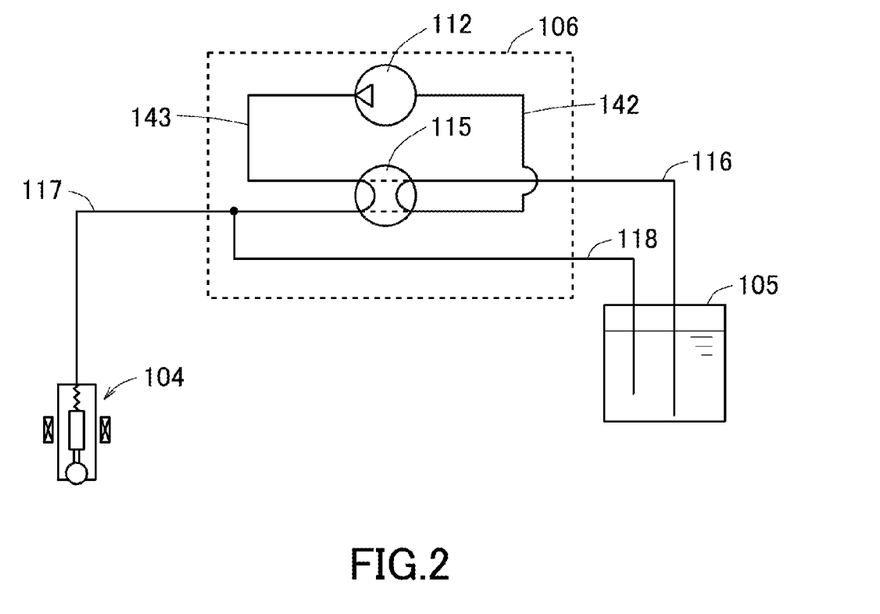
FIG. 2 is a diagram showing lines in and around a supply module.

As shown in FIG. 2, the liquid feed line 116 extending from the urea tank 105 is connected to the suction side of the SM pump 112 via the reverting valve 115 and an inlet line 142. The SM pump 112 is also connected to the dosing valve 104 via an outlet line 143 connected to the discharge side thereof and the reverting valve 115.

The reverting valve 115 can switch between the line shown by the solid line in the drawing and the line shown by the dashed line in the drawing, so that both supply of urea solution from the urea tank 105 to the dosing valve 104 and collection of urea solution from the dosing valve 104 to the urea tank 105 can be performed.

The collection line 118 is connected to the pressure-feed line 117 connected to the dosing valve 104 and is configured to feed urea solution back to the urea tank 105.

The line configuration described above is just an example, and the present invention is not limited to the configuration described above.

The urea tank 105 is provided with an SCR sensor 119. The SCR sensor 119 includes a level sensor 120 that measures the liquid level of the urea solution in the urea tank 105, a temperature sensor 121 that measures the temperature of the urea solution in the urea tank 105 and a quality sensor 122 that measures the quality of the urea solution in the urea tank 105. The quality sensor 122 determines the quality of the urea solution in the urea tank 105 by detecting the concentration of the urea solution or whether or not foreign matter is mixed into the urea solution from the propagation velocity of an ultrasonic wave or the electrical conductivity.

A cooling line 123 through which cooling water for cooling the engine E circulates is connected to the urea tank 105 and the supply module 106. The cooling line 123 passes through the urea tank 105 so that heat exchange occurs between the cooling water flowing through the cooling line 123 and the urea solution in the urea tank 105. The cooling line 123 also passes through the supply module 106 so that heat exchange occurs between the cooling water flowing through the cooling line 123 and the urea solution in the supply module 106.

The cooling line 123 is provided with a tank heater valve (coolant valve) 124 that selectively supplies or does not supply the cooling water to the urea tank 105 and the supply module 106. The cooling line 123 is also connected to the dosing valve 104. However, the dosing valve 104 is configured to be supplied with the cooling water whether the tank heater valve 124 is open or closed. Although not shown in the simplified configuration shown in FIG. 1, the cooling line 123 is arranged along the liquid feed line 116, the pressure-feed line 117 and the collection line 118 through which the urea solution flows.

Figure 3:
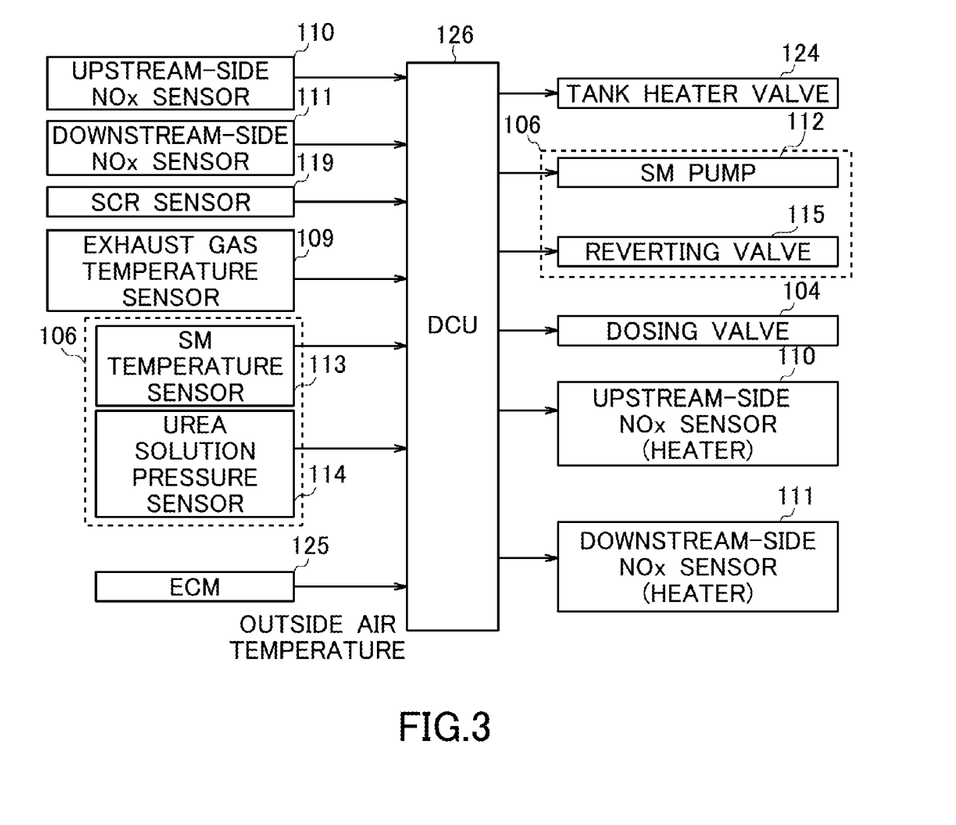
FIG. 3 is a diagram showing an input/output configuration of a dosing control unit ("DCU").

FIG. 3 is a diagram showing an input/output configuration of the DCU 126.

As shown in FIG. 3, input signals lines from the upstream-side $NO_X$ sensor 110, the downstream-side $NO_X$ sensor 111, the SCR sensor 119 (the level sensor 120, the temperature sensor 121 and the quality sensor 122), the exhaust gas temperature sensor 109, the SM temperature sensor 113 and the urea solution pressure sensor 114 of the supply module 106, and an engine control module (ECM) 125 that controls the engine E are connected to the DCU 126. Signals indicative of the outside air temperature and engine parameters (including the engine rotation speed) are input from the ECM 125.

Furthermore, output signal lines to the tank heater valve 124, the SM pump 112 and the reverting valve 115 of the supply module 106, the dosing valve 104, a heater of the upstream-side $NO_X$ sensor 110 and a heater of the downstream-side $NO_X$ sensor 111 are connected to the DCU 126. Signal exchange between the DCU 126 and each component can occur through the individual signal line or via a controller area network (CAN).

The DCU 126 is configured to estimate the amount of $NO_X$ in the exhaust gas based on a signal indicative of an engine parameter from the ECM 125 and the exhaust gas temperature from the exhaust gas temperature sensor 109 and determine the amount of urea solution to be injected through the dosing valve 104 based on the estimated amount of $NO_X$ in the exhaust gas. Furthermore, when the determined amount of urea solution is injected through the dosing valve 104, the DCU 126 is configured to control the dosing valve 104 based on the detection value from the upstream-side $NO_X$ sensor 110 to adjust the amount of urea solution injected through the dosing valve 104.

The SCR system 100 is normally configured to close the dosing valve 104 when the SCR catalyst temperature (exhaust gas temperature) is lower than the temperature at which an SCR catalyst becomes active (C ° C.) and permits injection of urea solution through the dosing valve 104 when the exhaust gas temperature rises sufficiently beyond the temperature at which the SCR catalyst becomes active. A sensor that directly measures the SCR catalyst temperature is not typically provided, so that the measurement value of the exhaust gas temperature sensor 109 is used as the SCR catalyst temperature. That is, the SCR catalyst temperature is the same as the exhaust gas temperature.

When injection of urea solution through the dosing valve 104 is permitted, the urea solution is appropriately injected according to the amount of $NO_X$ in the exhaust gas. When urea solution is injected through the dosing valve 104 in this way, the urea solution in the urea tank 105 that is not at high temperature is supplied to the dosing valve 104 by the supply module 106, so that the urea solution in the dosing valve 104 does not rise in temperature and crystallize.

However, when the exhaust gas temperature is lower than the temperature at which the SCR catalyst becomes active, injection of urea solution through the dosing valve 104 does not occur. Since urea solution crystallizes at temperatures from A ° C. to B ° C., if the exhaust gas temperature is equal to or higher than A ° C. and lower than C ° C., for example, the urea solution in the dosing valve 104 exposed to the heat of the exhaust gas at that temperature can crystallize and cause malfunction of the dosing valve 104.

To solve the problem, the SCR system 100 according to the present invention is provided with a fixation prevention system that opens the dosing valve 104 and controls the supply module 106 to feed the urea solution in the dosing valve 104 back to the urea tank 105 to prevent fixation of urea solution to the interior of the dosing valve 104 when the exhaust gas temperature is equal to or higher than the temperature at which urea solution crystallizes even if the exhaust gas temperature is lower than the temperature at which the SCR catalyst becomes active. The fixation prevention system is provided in the DCU 126.

The fixation prevention system is configured to monitor the measurement value of the exhaust gas temperature sensor 109, and opens the dosing valve 104, switches the reverting valve 115 of the supply module 106 and activates the SM pump 112 to forcedly perform emptying (forced emptying) if the measurement value is equal to or higher than the temperature at which the urea solution crystallizes and lower than the SCR catalyst becomes active.

In other words, the fixation prevention system determines whether or not the exhaust gas temperature is equal to or higher than the temperature at which the urea solution crystallizes and lower than the temperature at which the urea solution is injected by monitoring the measurement value of the exhaust gas temperature sensor 109, and performs forced emptying if the exhaust gas temperature is equal to or higher than the temperature at which the urea solution crystallizes and lower than the temperature at which the urea solution is injected.

This operation can remove the urea solution in the dosing valve 104 before the urea solution crystallizes, so that the urea solution can be prevented from crystallizing in the dosing valve 104 and adhering to the interior of the dosing valve 104.

As described above, the SCR system according to the present invention provided with the fixation prevention system can prevent fixation of urea solution to the interior of the dosing valve 104 when the urea solution is not injected through the dosing valve 104.

According to this embodiment, the fixation prevention system is configured to perform forced emptying when the exhaust gas temperature is equal to or higher than the temperature at which the urea solution crystallizes and lower than the SCR catalyst becomes active. However, instead of performing forced emptying, the fixation prevention system may be configured to intermittently opens the dosing valve 104 (every 3 minutes, for example) to discharge a small amount of urea solution from the dosing valve 104 at predetermined time intervals. This operation can also discharge the urea solution in the dosing valve 104 before the urea solution crystallizes, so that the urea solution can be prevented from crystallizing in the dosing valve 104 and adhering to the interior of the dosing valve 104.

The invention claimed is:

1. A selective catalytic reduction system for an engine, comprising:
   a dosing valve to inject urea solution into an exhaust pipe on an upstream side of a selective catalytic reduction device for performing a purification reaction;
   a detector to detect a temperature of exhaust gas in the exhaust pipe;
   a supply line that supplies the urea solution from a urea tank to the dosing valve and from the dosing valve back to the urea tank,
   wherein the dosing valve is closed when the detected exhaust gas temperature is lower than a temperature at which the selective catalytic reduction device performs the purification reaction; and
   a controller configured to, when the detected exhaust gas temperature is lower than the temperature at which the selective catalytic reduction device performs the purification reaction but equal to or higher than a temperature at which the urea solution crystallizes, forcibly empty the dosing valve by opening the dosing valve and sucking the exhaust gas from the exhaust pipe into the open dosing valve and supplying the exhaust gas from the dosing valve to the urea tank to move the urea solution from the dosing valve to the urea tank, so as to prevent crystallization of the urea solution and prevent fixation of crystallized urea solution to an interior of the dosing valve, even if the engine is running.

2. The selective catalytic reduction system according to claim 1, wherein said supply line includes a pump that pressure-feeds the urea solution and a reverting valve that switches between liquid feed channels through which the pump supplies the urea solution.

* * * * *